(12) United States Patent
Rice et al.

(10) Patent No.: US 6,338,509 B1
(45) Date of Patent: Jan. 15, 2002

(54) ROOF LATCH MECHANISM (75) Inventors: John R. Rice, Clinton Township; Lloyd Walker Rogers, Jr., Shelby Township, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/539,934

(22) Filed: Mar. 31, 2000

(51) Int. Cl.[7] ................................................ E05C 3/16
(52) U.S. Cl. .................... 292/223; 292/DIG. 5
(58) Field of Search ................................ 292/113, 216, 292/217, 219, 223, DIG. 5, DIG. 11, DIG. 12; 296/121

(56) References Cited

U.S. PATENT DOCUMENTS

| | | | |
|---|---|---|---|
| 4,548,434 A | * 10/1985 | Princell | 292/223 |
| 5,904,394 A | * 5/1999 | Dilluvio et al. | 296/121 |
| 6,155,614 A | * 12/2000 | Lange | 292/113 |

* cited by examiner

*Primary Examiner*—Christopher P. Schwartz
(74) *Attorney, Agent, or Firm*—Patrick M. Griffin (57) ABSTRACT

According to the present invention a latch assembly for use in an adjustable vehicle roof panel assembly including a roof panel which is driven by a motor drive unit and a cable is provided. The latch assembly utilizes a simple mechanical release mechanism which is designed to hold the roof panel in a sealed position and disengages mechanically utilizing the power roof motor instead of having a separate solenoid or motor drive unit. The release mechanism includes a latch arm and a latch catch member which are rotatably mounted so that actuation of the power roof motor causes a release member to mechanically trigger the latch arm causing rotation thereof which leads to disengagement between the latch arm and the latch catch member. Once the latch arm and the latch catch member disengage, a rear end of the roof panel is free to travel with a channel in the base. A front end of the roof panel is raised and guided within the channel by a guide member which is also mechanically linked to the release member so that movement of the release member causes the raising and movement of the front end. Once unlatched, the roof panel is free to move forwardly and rearwardly within the channel so as to open the roof.

22 Claims, 11 Drawing Sheets

ROOF LATCH MECHANISM

TECHNICAL FIELD

The present invention relates generally to a latch mechanism and more particularly, to a latch mechanism for a removable roof panel which permits the roof panel to latch within the roof in a sealed manner and then ride within the roof structure when the latch mechanism is disengaged.

BACKGROUND OF THE INVENTION

Retractable roof panels are widely used in vehicle applications to offer the operator of a vehicle an additional feature which provides both aesthetic appeal and also offers utility. For example, the operator may actuate an electrical/mechanical mechanism for causing the retraction of a roof panel within guide rails formed in the roof structure of the vehicle. Typically, the roof panel rides within the guide rails and is stored within a compartment defined by opposing sections of the roof itself. In this open position, an opening formed in the roof is uncovered by the displacement of the roof panel and therefore the operator and/or occupants in the vehicle have an open air opening provided thereby. The electrical/mechanical mechanism likewise permits the roof panel to close. The actual movement of the roof panel is caused usually by a motor which drives the roof panel from the closed position to the open position or intermediate positions therebetween and vice versa.

Typically, the electrical/mechanical mechanism for actuating the opening and closing of the roof panel includes a latch assembly for locking the roof panel in a locked position within the roof structure. The latch mechanism may involve any number of systems but conventional latch mechanisms comprise latches with solenoids or motor actuators for locking the roof panel in the closed position. This adds considerable cost to the overall latch assembly and therefore it would be desirable to provide a simple, cost effective latch assembly which does not require the use of a motorized latch assembly for the latching and unlatching of the roof panel within the roof structure.

SUMMARY OF THE INVENTION

In accordance with the present invention, a removable roof panel assembly is provided in which the assembly includes a latch mechanism that is not driven by a solenoid or motor actuator but rather mechanically links the motor drive unit, which serves to drive the roof panel, with the latch mechanism. More specifically, the roof panel assembly includes a motor drive unit which is attached to a cable for driving the roof panel in forward and rearward directions. A base is designed to house a number of the components of the assembly and in one exemplary embodiment, the base forms a part of a side roof rack provided on one side of a roof of a vehicle with the roof panel being disposed intermediate to opposing side roof racks. The base has first and second channels formed therein and the base has a first end and an opposing second end. The first channel comprises a longitudinal channel which receives a release member. The release member has a first end with a tab extending outwardly therefrom at the first end so that the first end is generally L-shaped. A second end of the release member has a boss extending outwardly therefrom with both the tab and the boss extending in the same direction from the release member. The release member is attached to the cable and therefore the reeling and unreeling of the cable causes movement of the release member.

The boss at the second end of the release member is received within a slot formed in an upper first end of a guide member which is disposed generally within the second channel. A lower second end of the guide member is initially disposed within a recessed portion of the second channel. The second end of the guide member has a protrusion extending outwardly therefrom and being received within a bore formed on one side of the roof panel so as to securely attach the guide member to a front end of the roof panel. The base and more specifically the first channel is partially open where the base has a cut-away portion to accommodate the first end of the guide member when the second end is disposed downwardly in the recessed portion.

The assembly further includes a roller member for guiding and permitting a rear end of the roof panel to travel within the second channel. The roller member comprises an annular member having an opening formed therethrough, wherein a coupler is disposed within the opening. The coupler has a boss which extends through the opening and into the side surface of the roof panel so as to securely attach the roller member to the rear end of the roof panel.

The assembly includes a latch mechanism which comprises a latch arm and a latch catch member. The latch arm has an opening formed at a first end wherein a connector is received within the opening and serves to mechanically link the latch arm to the release member. More specifically, the connector has a base and a boss extending therefrom with the boss extending through the opening formed in the latch arm so as to securely attach the two components. The connector and latch arm are spring loaded so that upon return motion of the release member and contact therewith the connector rotates, however, the latch arm does not rotate. The connector also includes a flag portion which extends upwardly from the base. The flag portion is disposed partially within the first channel so that the tab of the release member contacts the flag portion when the release member travels within the first channel is a direction away from the first end of the base. The latch arm also includes a shoulder which serves to engage a first arm of the latch catch member so as to lock the two components with respect to one another. The latch catch member also includes a second arm spaced from the first arm. The first and second arms trap the roller member and the coupler therebetween when the roof panel is in a locked position.

The unlatching of the assembly occurs when the release member is pulled by the motor drive unit via the cable causing the release member to travel with the first channel away from the closed first end of the base. Because the boss of the release member travels within the slot formed in the guide member, the roof panel doesn't move until lost motion is taken up and the unlatching has occurred. The tab of the release member strikes the flag portion of the connector causing rotation thereof which in turn causes rotation of the latch arm. As the latch arm rotates, the first arm of the latch catch member disengages from the shoulder of the latch arm. This disengagement permits the latch catch member to rotate and the roller member is free to travel within the second channel once the roller member clears the latch catch member.

At the same time, the movement of the release member causes the guide member to travel upwardly after lost motion is taken up within the recessed portion of the second channel and into the remaining portions of the second channel. This upward movement of the guide member raises the front end of the roof panel and directs the front end within the second channel. In the locked position, the roller member is disposed within a downwardly angled section of the second channel so that when the latch mechanism unlatches, the roller member rides upwardly in the angled section and travels within the second channel. Because the angled section and the recessed portion are thus orientated below the remaining portions of the second channel, the roof panel is in a lowered, locked position when the roller member and the guide member are disposed in these areas. Once the latch mechanism is unlatched, the roof panel rides upwardly within the respective sections of the second channel causing the roof panel to be raised and then the roof panel may be driven either forward or rearward in the second channel once it is raised.

A base cover is provided to enclose several of the components of the assembly including the guide member and the connector. The base cover includes slots formed therein which correspond to the second channel of the base and a slot for placement of the connector so that the connector communicates with both the first and second channels. The latch arm and the latch catch member are disposed on the outside of the base cover and create a gap between the base cover and the side surface of the roof panel. In the exemplary embodiment, the latch arm and the latch catch member are rotatably attached to the base cover.

Advantageously, the roof panel assembly of the present invention uses a latch mechanism that is not driven by a solenoid or motor actuated. Such conventional latch mechanisms are considerably more costly than the latch mechanism of the present invention and also add complexity to the overall design. The present assembly cost less because of its use of a mechanical latch mechanism and also provides improved reliability because of the simplified design.

The above and other objects and advantages of the invention will be apparent from the following description, the accompanying drawings and the appended claims.

BRIEF DESCRIPTION OF THE DRAWINGS

Referring now to the drawings wherein like elements are numbered alike in the several Figures.

DETAILED DESCRIPTION OF THE PREFERRED EMBODIMENT

Figure 1:
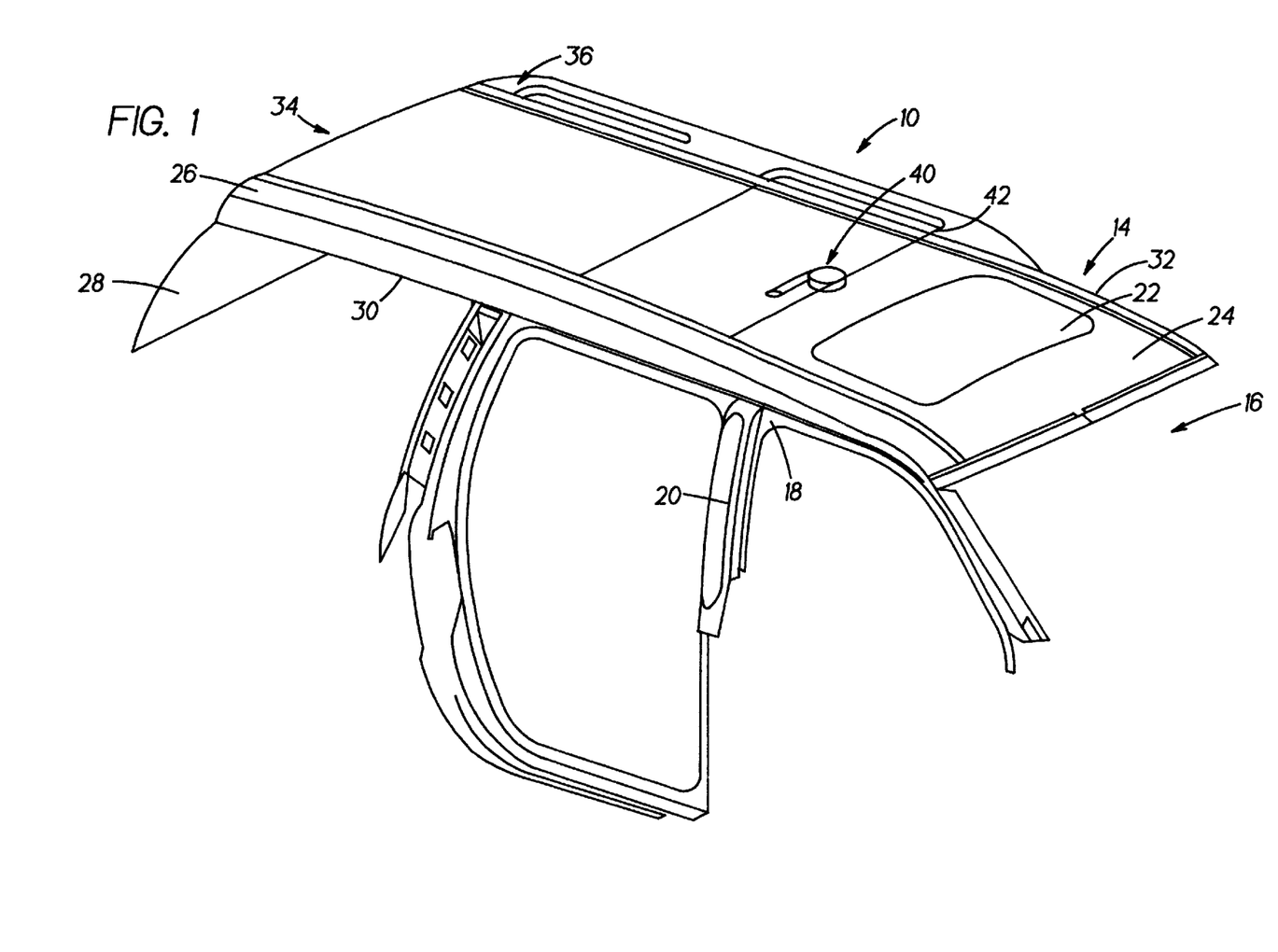
FIG. 1 is a perspective view of an exemplary adjustable roof panel assembly for use a vehicle according to the present invention.
Figure 2:
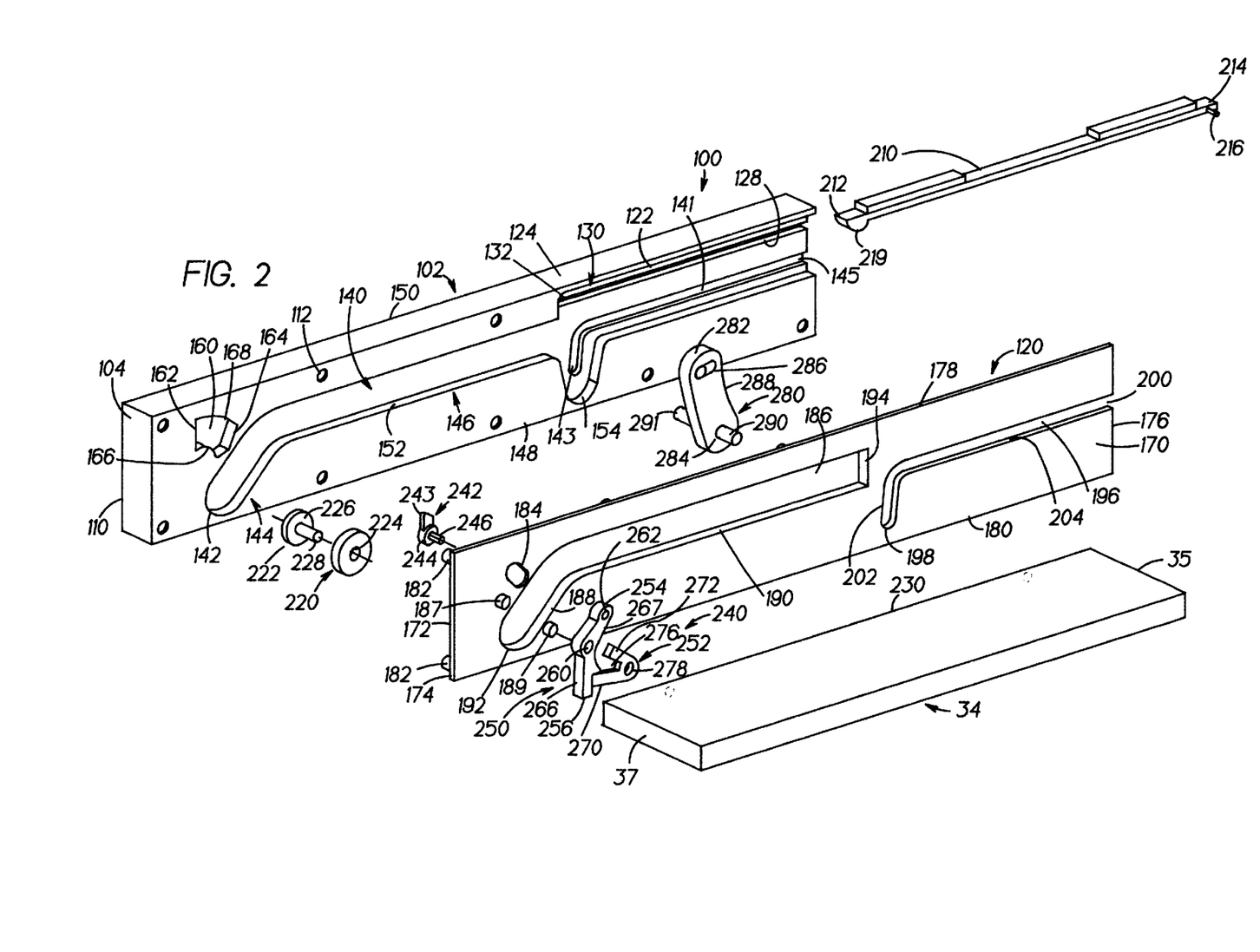
FIG. 2 is an exploded perspective view of a latch assembly according se present invention for use in the roof panel assembly of FIG. 1.
Figure 3:
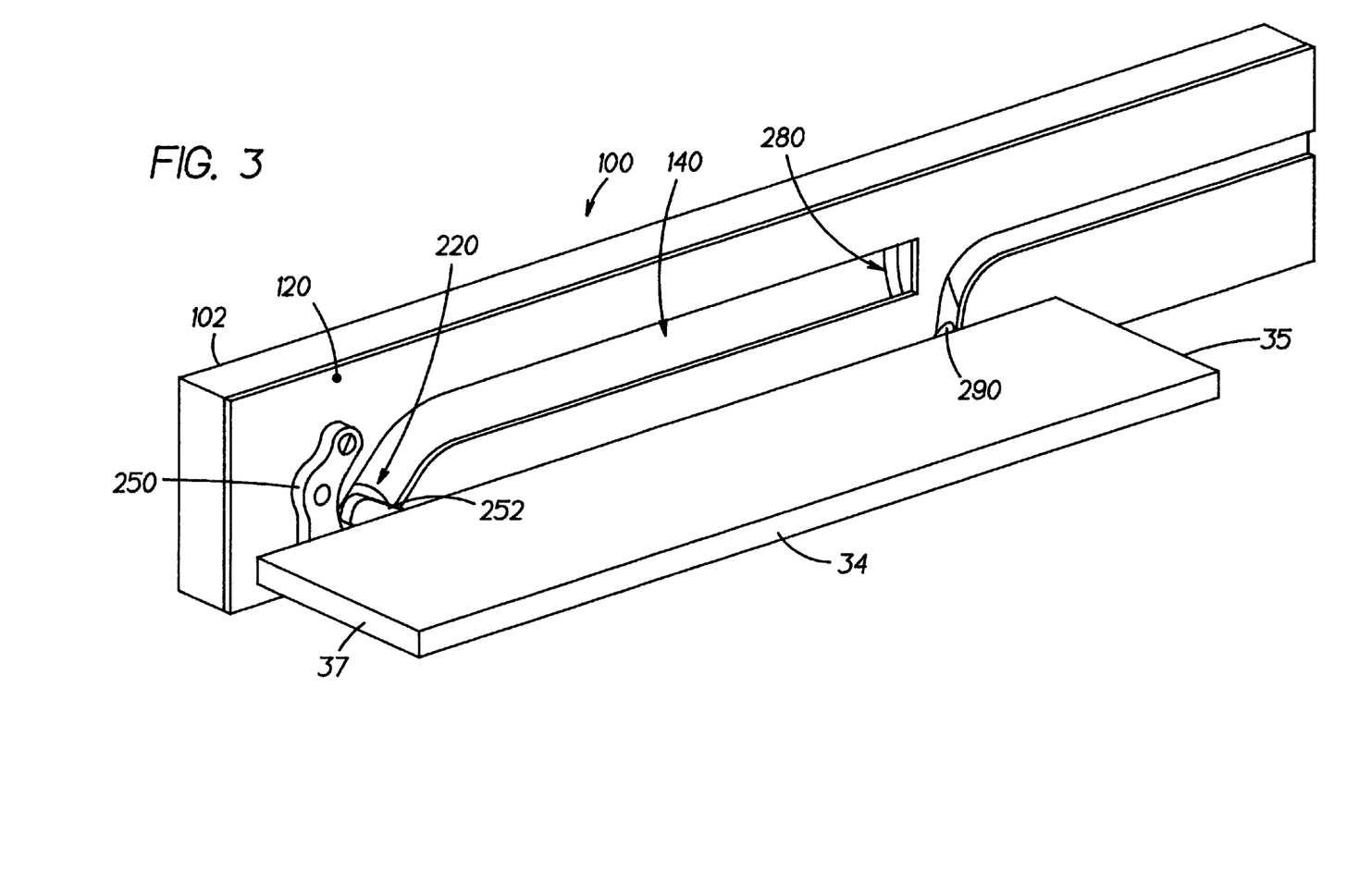
FIG. 3 is a perspective view of the latch assembly of FIG. 2 in an ass bled condition.

Referring now to FIGS. 1–3 in which an exemplary roof panel system embodying the present invention is generally indicated at 10. The roof panel system 10 comprises an automated system which permits a removable roof panel 34 to be opened and closed relative to a roof structure 14 of a vehicle generally indicated at 16. The vehicle 16 includes an upper chassis 18 which forms the roof structure 14 and other structures such as window pillars 20 and the like. In the exemplary embodiment shown, the vehicle 16 also includes an operatable moon or sun roof 22 which is disposed within a forward section 24 of the roof structure 14. The roof structure 14 has an opposing rear section 26 which is proximate the rear window 28 of the vehicle 16 and has left and right sides 30, 32. According to the present invention, the roof panel system includes a removable roof panel 34 which in the illustrated embodiment is positioned rearwardly within the roof structure 14. It is within the scope of the present invention that the roof panel 34 may include a transparent section, such as a glass insert, or the roof panel 34 may be completely opaque as when the roof panel 34 is formed of the same or similar material as the remaining portions of the roof panel 34.

The roof panel system 10 also includes left and right side rack members 36 which are disposed on the roof structure 14 and more specifically are disposed at or proximate to the left and right sides 30, 32 of the roof structure 14. For ease of illustration, only one side rack member 36 is shown in FIG. 1. The roof panel system 10 further includes a motor drive unit 40 which acts to drive the roof panel 34 so that the roof panel 34 is either opened or closed relative to the roof structure 14. More specifically, the roof panel system 10 has a cable 42 which forms a part of a latch assembly (not shown) embodying the present invention in which the latch assembly is disposed within one of the left and right side rack members 36. As will be described in greater detail hereinafter the actuation of the motor drive unit 40 results in the displacement of the cable 42 which causes the latch assembly to unlatch thereby permitting the roof panel 34 to be driven open by the motor drive unit 40. Thus, the motor drive unit 40 serves to both unlatch the roof panel 34 and also acts to drive the unlatched roof panel 34 from a closed position to an open position and to positions therebeween. The motor drive unit 40 may comprise any number of motorized units which are sufficient to drive the roof panel 34.

Now referring to FIG. 2 which is an exploded perspective view of an adjustable roof panel assembly 100 according to the present invention. In an exemplary embodiment, the roof panel assembly 100 is disposed within and more particularly forms a part of at least one side rack member 36. The roof panel assembly 100 includes a base 102 having a first end 104 and an opposing second end 106. The base 102 is generally rectangular shaped in the embodiment illustrated in FIG. 1. The base 102 has a first surface 108 and an opposing second surface 110. The first surface 108 has a plurality of openings 112 formed therein around a periphery thereof. The plurality of openings 112 act in part to retain the base 102 to a base cover 120. The base 102 includes a first channel 122 formed therein proximate an upper surface 124 of the base 102. The first channel 122 comprises a longitudinal channel which extends from the first end 104 to the second end 106. The first channel 122 is defined partially by an intermediate surface 128 and the upper surface 124 of the base 102. The first surface 108 of the base 102 also defines and encloses one side of the first channel 122; however, it will be noted that as shown in FIG. 1, the first surface 108 has a cut-away portion 130 generally between a portion of the intermediate surface 128 and the upper surface 124 approaching the second end 106. This cut-away portion 130 permits access and viewing of the first channel 122 in this selected area of the base 102. The cut-away portion 130 includes an angled edge 132 at one end opposite the second end 106. The remaining portions of the first channel 122 are hidden from view by the surfaces of the base 102.

The base 102 also includes a second channel 140 formed therein and generally extending from a point proximate the first end 104 to the second end 106. More specifically, the second channel 140 has a closed first end 142 which comprises a rounded closed end in the illustrated embodiment. The second channel 140 is generally formed of two sections, namely an angled first section 144 and a longitudinal second section 146 which extends from a point near the second end 106 towards the first end 104 with the second section 146 being open at the second end 106. The angled first section 144 extends downwardly from one end of the second section 146 towards a bottom surface 148 of the base 102 proximate the first end 104. The second channel 140 is defined by an upper edge 150 and a lower edge 152 where the two edges smoothly join at the closed rounded end of the second channel 140. The second channel 140 has a lower recessed section 154 formed as part of the lower edge 152. The lower recessed section 154 is formed intermediate to the closed first end 142 of the second channel 140 and the second end 106. In the illustrated embodiment, the lower recessed section 154 is generally U-shaped and opens upward facing the first channel 122. The base 102 also has a recessed section 160 formed therein generally between the angled first section 144 of the second channel 140 and the upper surface 124 of the base 102. The recessed section 160 is formed of a first vertical edge 162 and an opposing outwardly bowed edge 164 and first and second arcuate edges 166, 168 which extend between first and second ends, respectively, of the first vertical edge 162 and the outwardly bowed edge 164. The base 102 further includes a track 141 formed therein and more particularly, the track 141 is formed within a portion of the second channel 140. The track 141 has a first end 143 and a second end 145 with the first end 143 being located within the lower recessed section 154 and the second end 145 generally being at second end 106 of the base 102. The track 141 is thus angled downward within the lower recessed section 154.

The base cover 120 has a first surface 170 and an opposing second surface 172 and first and second ends 174, 176, respectively, and an upper edge 178 and an opposing lower edge 180. The base cover 120 is generally shaped and sized so as to attach to the base 102 to partially enclose portions of the second channel 140, the recessed section 160 and the first channel 122. When the base cover 120 mates with the base 102 the second surface 172 of the base cover 120 faces the first surface 108 of the base 102. The base cover 120 has a plurality of pegs 182 which extend outwardly away from the second surface 172 of the base cover 120. The plurality of pegs 182 are designed to be frictionally received within the plurality of openings 112 formed in the base 102 so as securely attach the base cover 120 to the base 102.

The base cover 120 has a first slot 184 formed therein which is disposed over the recessed section 160 when the base cover 120 is attached to the base 102. The first slot 184 is generally oblong in shape; however, it will be appreciated that other shapes may be used. The base cover 120 further includes a second slot 186 formed therein. Similar to and complementary to the second channel 140, the second slot 186 has an angled first section 188 and a second section 190. The angled first section 188 terminates with a closed rounded end 192 and the second section 190 terminates with a vertical end 194. A width of the second slot 186 is slightly less than a width of the second channel 140 so that the base cover 120 overlaps peripheral edges of the second channel 140. The base cover 120 also has a third slot 196 formed therein, wherein the third slot 196 has a closed first end 198 and an open second end 200. The third slot 196 is also formed so that it includes an angled first section 202 and a longitudinal second section 204 which extends to the second end 176 of the base cover 120. The third slot 196 has a width less than the width of the second slot 186 and when the base cover 120 is attached to the base 102, the closed first end 198 and a substantial portion of the angled first section 202 is disposed over the lower recessed section 154 and the longitudinal second section 204 is disposed over the second channel 140 and more specifically over the longitudinal second section 146 of the second channel 140. The third slot 196 and the track 141 are similar in shape and have similar purposes as will be described hereinafter. The base cover 120 further includes a pair of bosses 187, 189 which extend outwardly away from the base cover 120. In the exemplary embodiment, the bosses 187, 189 comprise annular protrusions.

Referring to FIGS. 1 and 2. The removable roof panel assembly 100 also includes a release member 210 which comprises an elongated member having a first end 212 and an opposing second end 214. The first end 212 has a tab 219 extending thereaway so that the release member 210 is generally L-shaped at the first end 212. The L-shape is defined by the release member 210 and the tab 219 which extends therefrom at the first end 212. At the second end 214, a boss 216 is formed. The release member 210 is designed to be received within the first channel 122 so as to travel therein when movement of the release member 210 is caused by the motor drive unit 40. The release member 210 is connected to the cable 42 so that when the motor drive unit 40 is actuated and causes reeling or unreeling of the cable 42, the release member 210 is caused to move within the first channel 122. During assembly, the release member 210 is inserted into the first channel 122 so that the first end 212 thereof is positioned at the end of the first channel 122 adjacent to the first end 104 of the base 102. The tab 219 of the release member 210 extends within the recessed section 160 in this position. When the base cover 120 is attached to the base 102, the boss 216 extends outwardly away from the base 102 and it is understood that the length of the boss 216 is such that it does not contact the base cover 120 when the same is attached to the base 102. This permits the release member 210 to ride within the first channel 122.

The roof panel assembly 100 further includes a roller member 220 and a coupler 222 which serves to couple the roller member 220 to the roof panel 34 as will be described hereinafter. The roller member 220 comprises an annular roll member including an opening 224 formed therein. The roller member 220 preferably has a diameter which is slightly less than the width of the second channel 140 so that the roller member 220 is free to rotate and ride within the second channel 140 from the closed first end 142 towards the second end 106 of the base 102. The coupler 222 comprises a base 226 and a boss 228 extending therefrom, wherein in the illustrated embodiment, the base 226 has an annular shape and the boss 228 has a generally circular cross section. The boss 228 has a diameter which is slightly less than a diameter of the opening 224 so that the boss 228 is frictionally received within the opening 224. As previously mentioned, the coupler 222 serves to couple the roller member 220 to the roof panel 34. This results by inserting in a frictional manner the end of the boss 228 into an opening (not shown) formed on a side surface 230 of the roof panel 34. Therefore the length of the boss 228 is such that it fully extends through the opening 224 of the roller member 220 and into the side surface 230 of the roof panel 34. The length of the boss 228 is also designed so that a gap is formed between the side surface 230 and the roller member 220. The gap permits other components of the roof panel assembly 100 to be disposed therebetween as will be described in greater detail hereinafter.

The roof panel assembly 100 includes a latch assembly 240 and a connector 242 which links the release member 210 to the latch assembly 240. The connector 242 comprises a body having a base portion 244 and a protrusion 246 extending outwardly therefrom. In the exemplary embodiment, the protrusion 246 comprises a peg which extends thereaway and has a generally circular crosssection. The connector 242 includes a flag portion 243 which extends from the base portion 244 and is designed to make contact with the tab 219 of the release member 210. When the base cover 120 is attached to the base 102, the connector 242 is disposed in the recessed section 160 so that the protrusion 246 extends through the first slot 184 of the base cover 120 so that the first slot 184 defines the range of movement of the protrusion 246 during actuation of the latch assembly 240.

The latch assembly 240 includes a latch arm 250 and a latch catch member 252. The latch arm 250 has a first end 254 and an opposing second end 256. Intermediate to the first and second ends 254, 256, the latch arm 250 has an opening 260 formed therein for pivoting the latch arm 250 about a pivot point defined by the opening 260. In the illustrated embodiment, the opening 260 is circular. The latch arm 250 also includes a second opening 262 (shown in FIG. 4) formed at the first end 254. The second opening 262 is also preferably circular in nature and is designed to receive the protrusion 246 of the connector 242 so as to rotatably connect the connector 242 to the latch assembly 240. The connector 242 is preferably spring loaded so as to assume a first position with the flag portion 243 upright. The contact between the release member 210 and the connector 242 overcomes the spring force and causes rotation of the connector 242. The latch arm 250 has at its second end 256 a ridge 264 which defines a shoulder 266 proximate the second end 256. It will be appreciated that in another embodiment, the portion of the latch arm 250 from the shoulder 266 to the second end 256 may be reduced in length. The latch arm 250 has a curved surface 267 extending from the shoulder 266 (best shown in FIG. 6) to the first end 254. In the illustrated embodiment, the surface 267 is generally concave in nature. The latch arm 250 is rotatably attached to the base cover 120 by inserting boss 187 within the opening 260.

The latch catch member 252 comprises a yoke-like member having opposing first and second arms 270, 272. The first and second arms 270, 272 define an opening 276 formed therebetween. The opening 276 is sized to receive the boss 228 of the coupler 222. In other words, the latch catch member 252 is disposed between the roller member 220 and the base cover 120 when the removable roof panel assembly 100 is assembled. The latch catch member 252 also has an opening 278 formed therein, wherein the opening 278 provides a pivot point for the latch catch member 252 so that the latch catch member 252 may pivot in a rotational manner. Boss 189 is received within the opening 278 so as to partially attach the latch catch member 252 to the base cover 120. The latch catch member 252 and the latch arm 250 engage one another to latch the roof panel 34 in a locked position as will be described in greater detail hereinafter.

The removable roof panel assembly 100 further includes a guide member 280. The guide member 280 comprises a generally oblong member with a first end 282 and an opposing second end 284. Near the first end 282, the guide member 280 includes a slot 286 formed therein. In the illustrated embodiment, the slot 286 has a generally oblong shape. The slot 286 is sized to receive the boss 216 extending from the release member 210 so that the slot 286 permits restricted movement of the boss 216 therein. One surface 288 of the guide member 280 has an arcuate surface and more specifically, the surface 288 is generally concave in nature. The guide member 280 has a first boss 290 which protrudes from the guide member 280 away from the base 102. In the exemplary embodiment, the first boss 290 comprises a peg which is received within an opening (not shown) formed in the side surface 230 of the roof panel 34 at an end opposite to the opening formed in the same side surface 230 for receiving the boss 228 of the coupler 222. The first boss 290 thus serves to secure the second end 284 of the guide member 280 to the roof panel 34 so that movement of the guide member 280 causes roof panel 34 to likewise move within the second channel 140. The first boss 290 extends through the third slot 196 and the third slot 196 serves to guide the second end 284 during the lifting of the guide member 280 during operation of assembly 100 because the movement of the roof panel 34 is guided by the first boss 290 traveling within the third slot 196. When the roof panel 34 is attached to the latch assembly 240 and the guide member 280, the roof panel 34 is positioned generally perpendicular to the base cover 120 and the base 102. FIG. 3 is a perspective assembled view of the removable roof panel assembly 100. The guide member 280 further includes a second boss 291 which extends outwardly from the guide member 280 in an opposite direction of the first boss 290. The second boss 291 is received and travels within the track 141 formed in the base 102 so as to guide and direct the front end 35 of the roof panel within the second channel 140.

Figure 4:
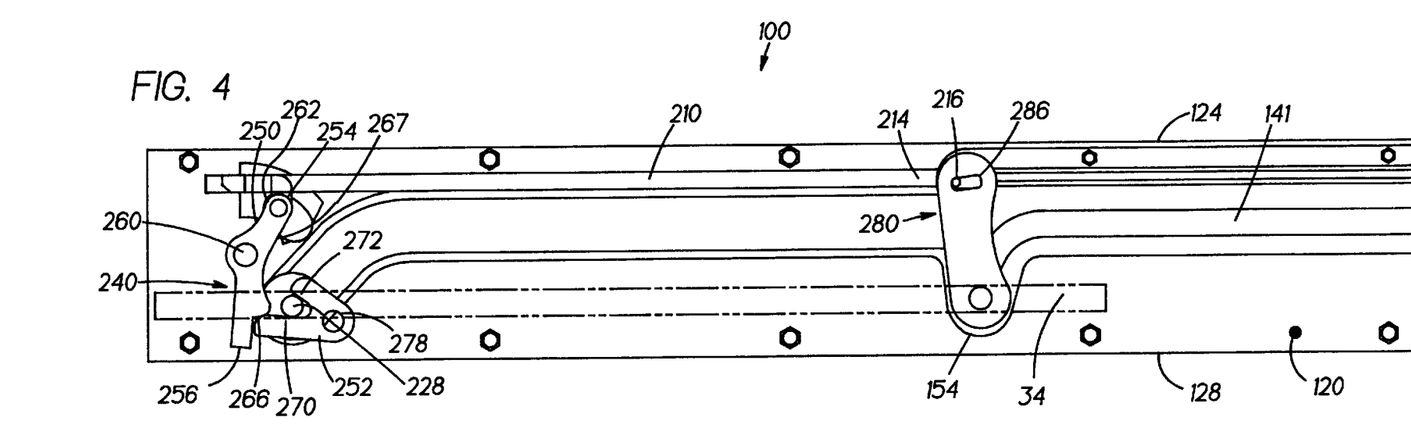
FIG. 4 is a sectioned side elevation view of the latch assembly of FIG. 2 in a first position.

Referring now to FIGS. 4–18 in which the sequential movement of the roof panel assembly 100 of the present invention is shown. FIG. 4 shows the roof panel assembly 100 in a first position in which all of the individual components of the assembly 100 are at rest and the roof panel 34 is in a latched position. In the latched position, the roof panel 34 is generally perpendicular to the base cover 120 and an upper surface of the roof panel 34 is substantially parallel to planes containing the upper and lower surfaces 124, 128, respectively of the base 102. In this latched position, the latch arm 250 engages the latch catch member 252 and more specifically, the first arm 270 seats against the shoulder 266. Because the latch catch member 252 is preferably biased by any number of means, including the use of a spring, the biasing member is compressed when the latch catch member 252 is in the position shown in FIG. 4. In this locked position, the boss 228 of the coupler 222 is disposed between the first and second arms 270, 272. In the locked position, the second end 284 of the guide member 280 is disposed within lower recessed section 154 and the first end 282 is disposed in the second channel 140 near the angled edge 132. The boss 216 at the second end 214 of the release member 210 is disposed within the slot 286 such that the boss 216 seats against an end of the slot 286 closer to the latch assembly 240.

Figure 5:
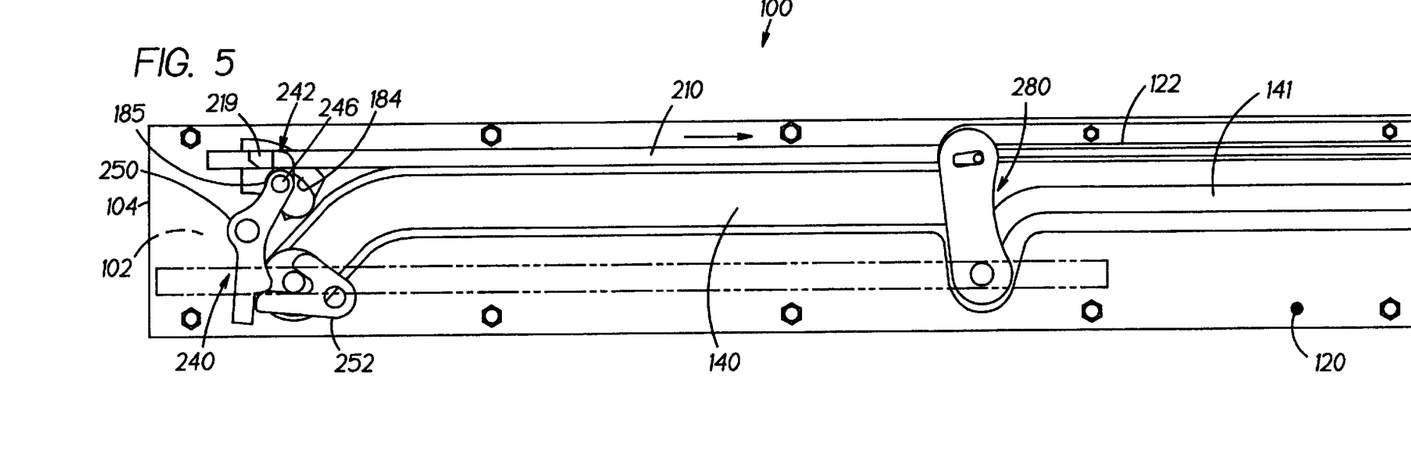
FIG. 5 is a sectioned side elevation view of the latch assembly of FIG. 2 in a second position.
Figure 6:
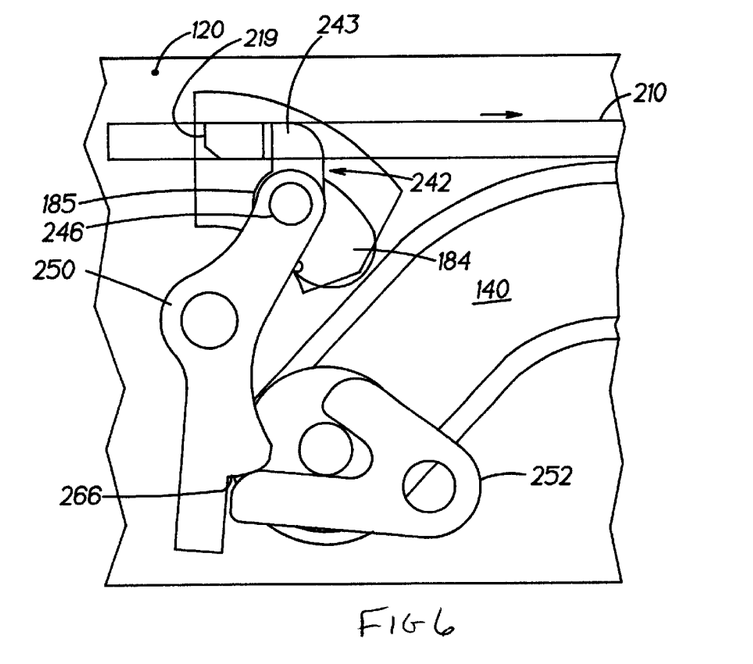
FIG. 6 is an enlarged view of a first section of the latch assembly in the second position shown in FIG. 5.
Figure 7:
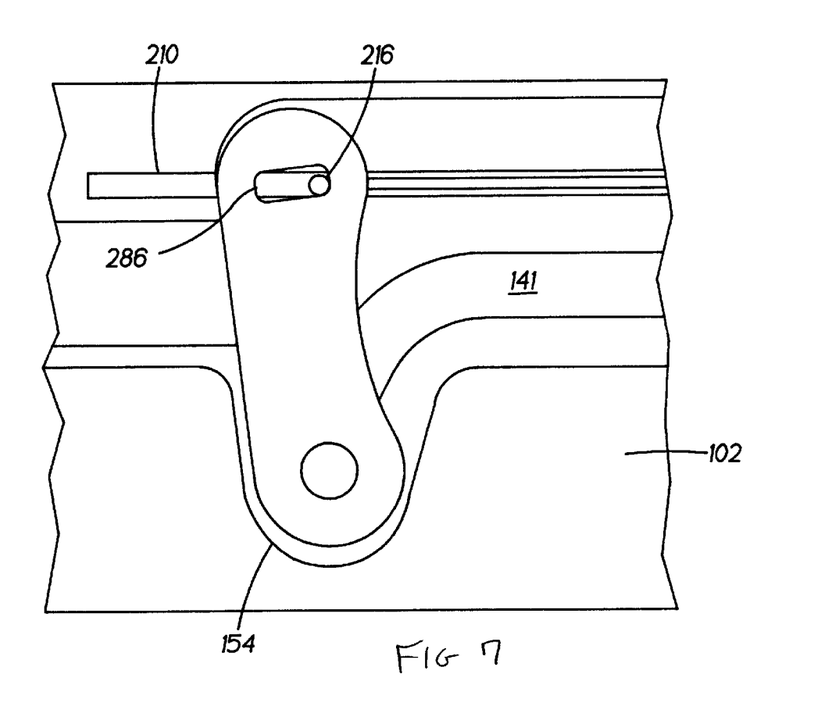
FIG. 7 is an enlarged view of a second section of the latch assembly in the second position shown in FIG. 5.

FIGS. 5–7 show the roof panel assembly 100 in a second position. To begin the opening of the roof panel 34, the motor drive unit 40 (FIG. 1) is actuated causing the cable 42 (FIG. 1) to be driven and this in turn causes the release member 210 to be driven in a direction away from the first end 104 of the base 102. In other words, the release member 210 is pulled within the first channel 122 in a direction towards the open second end 106 of the base 102. The tab 219 of the release member 210 contacts the flag portion 243 of the connector 242 and causes movement (e.g., rotation) thereof. Because the connector 242 and more specifically, the protrusion 246 thereof extends through the first slot 184 of the base cover 120, the range of movement of the connector 242 is limited by the shape and size of the first slot 184. As shown in more detail in FIG. 6, the connector 242 initially is disposed at an upper portion 185 of the first slot 184 so that movement of the release member 210 causes the connector 242 to travel downwardly within the first slot 184. As the release member 210 is continuously moved under the action of the motor drive unit 40, the movement of the connector 242 causes the latch arm 250 to begin to pivot in a clockwise direction. These movements begin the release cycle of the latch assembly 240. FIG. 7 shows the position of the guide member 280 and the release member 210 relative to each other and relative to the base 102 and the second channel 140 formed therein.

Figure 8:
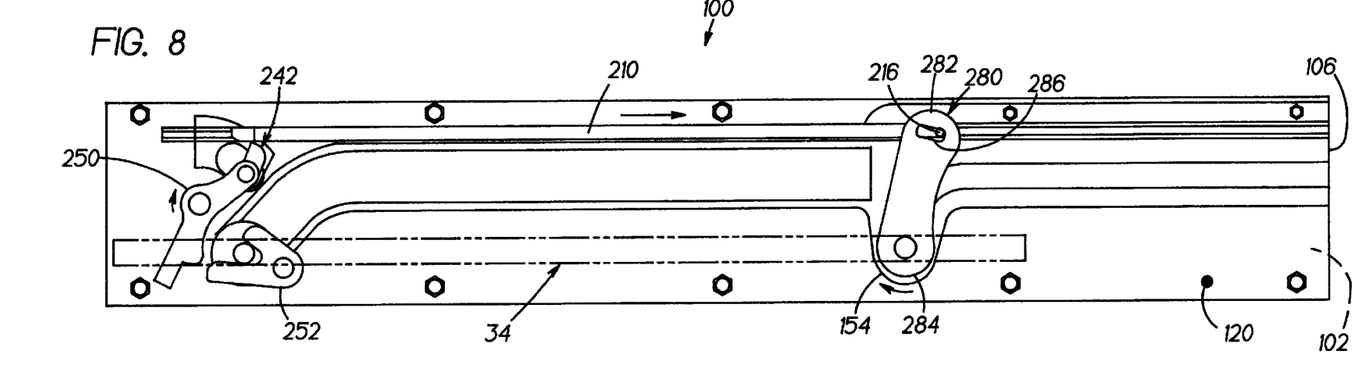
FIG. 8 is a sectioned side elevation view of the latch assembly of FIG. 2 in a third position.
Figure 9:
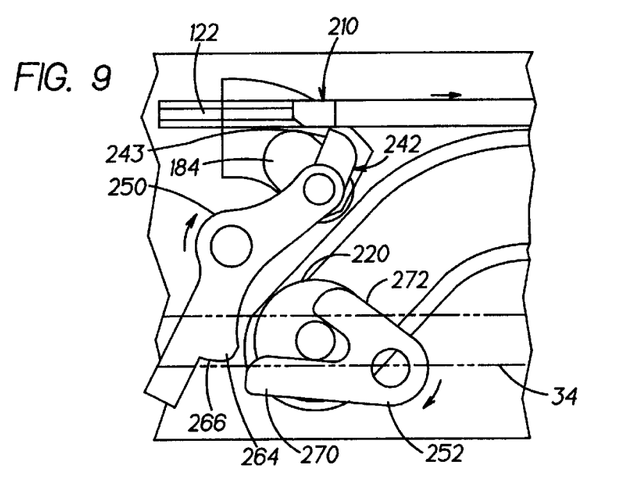
FIG. 9 is an enlarged view of a section of the latch assembly in the third position.

Now referring to FIGS. 8–9 which show a third position of the removable roof panel assembly 100 of the present invention. The release member 210 is designed so that it takes up lost motion in the guide member 280 by boss 216 traveling within the slot 286 of the guide member 280 as the guide member 280 is being driven towards the second end 106 of the base 102. This movement of the first end 282 results in the second end 284 being rotated in a clockwise direction within the lower recessed section 154. FIG. 9 shows in greater detail the relative movement between the release member 210, the connector 242 and the latch assembly 100. The movement of the release member 210 causes the connector 242 to be driven downwardly within the first slot 184, as shown, which causes the latch arm 250 to continue to rotate in a clockwise direction so that ridge 264 disengages from the first arm 270 of the latch catch member 252. Once latch arm 250 is released from the latch catch member 252, the latch catch member 252 is free to rotate itself. This rotation will also be in a clockwise direction.

Figure 10:
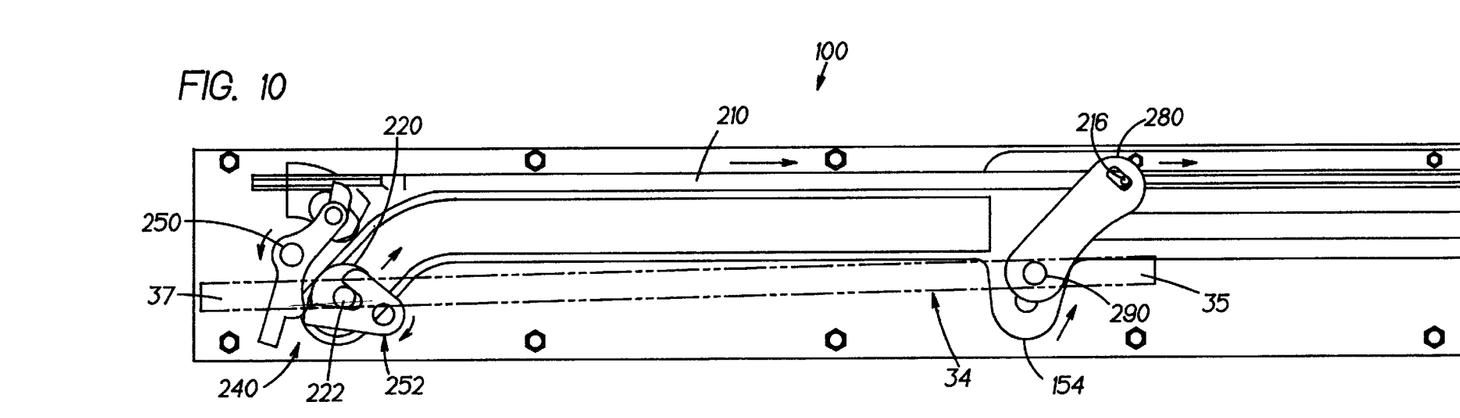
FIG. 10 is a sectioned side elevation view of the latch assembly of FIG. 2 in a fourth position.
Figure 11:
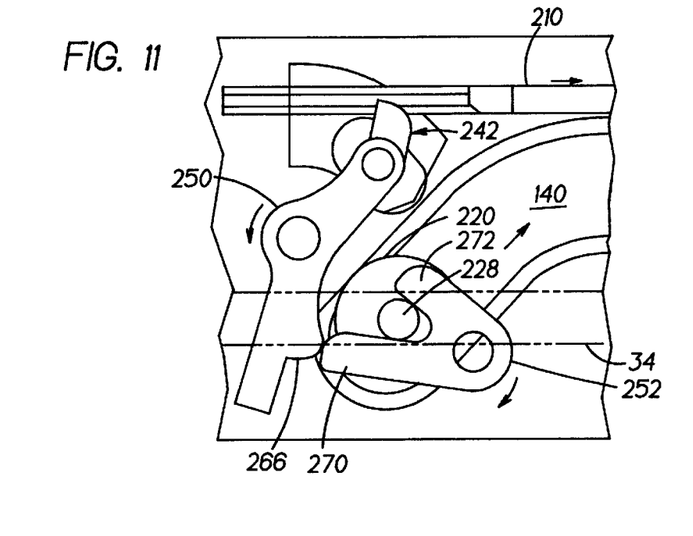
FIG. 11 is an enlarged view of a section of the latch assembly in the fourth position.

Now referring to FIGS. 10–11 in which a fourth position of the roof panel assembly 100 is shown. The release member 210 is continued to be pulled within the first channel 122 away from the first end 104. This continued movement of the release member 210 causes the guide member 280 to be displaced from the lower recessed section 154 of the base 102 and more specifically, the guide member 280 is lifted therefrom. This upward movement of the guide member 280 in turn upwardly lifts a front end 35 of the roof panel 34 because the first boss 290 of the guide member 280 is connected to the roof panel 34. At the same time, the movement of the release member 210 has disengaged the latch assembly 240 by releasing the latch arm 250 from the latch catch member 252 which permits a rear end 37 of the roof panel 34 to also upwardly lift resulting in the roller member 220 and the coupler 222 traveling within the second channel 140. FIG. 11 shows this fourth position in greater detail and shows the relative movement and positioning of the latch assembly 240 and the other components. Because of the biasing forces of the latch assembly 240, after the disengagement of the latch arm 250 from the latch catch member 252, the latch arm 250 rotates in a counterclockwise position after the first arm 270 clears and rides over the shoulder 266. The latch catch member 252 continues to rotate in a clockwise position as the roller member 220 and the coupler 222 travel upwardly within the second channel 140. This action of the latch catch member 252 is also caused by the spring force of the member 252. The upward movement of the coupler 222 and more specifically the boss 228 causes the boss 228 to contact the second arm 272 and force the clockwise rotation of the latch catch member 252. The design of the roller member 220 in being annular in shape permits the roller member 220 to roll within the second channel 140 and because the roof panel 34 is attached to the roller member 220, movement of the roof upward 34 is effectuated. As shown best in FIG. 11, in this fourth position, the release member 210 has cleared the connector 242.

Figure 12:
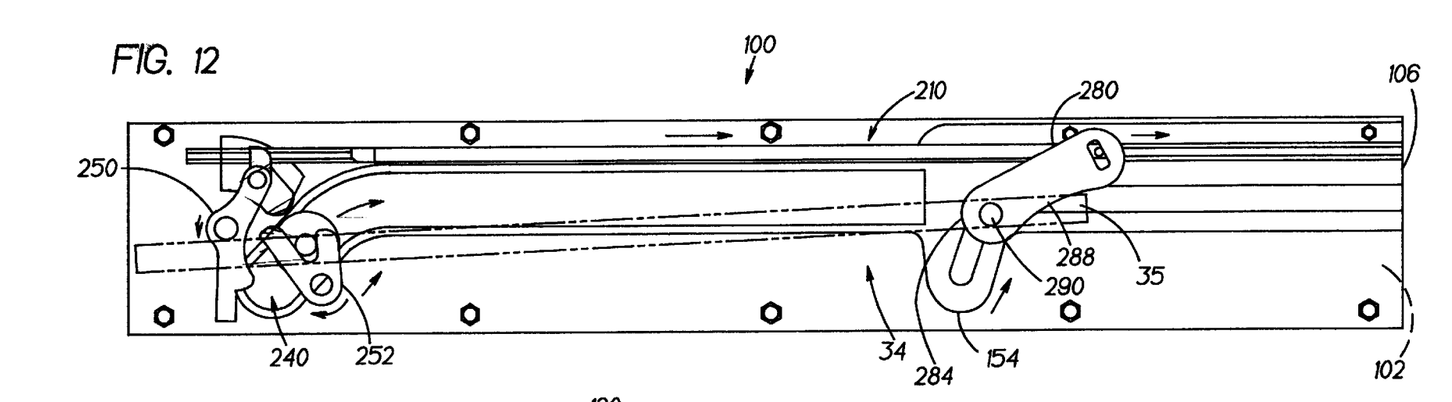
FIG. 12 is a sectioned side elevation view of the latch assembly of FIG. 2 in a fifth position.
Figure 13:
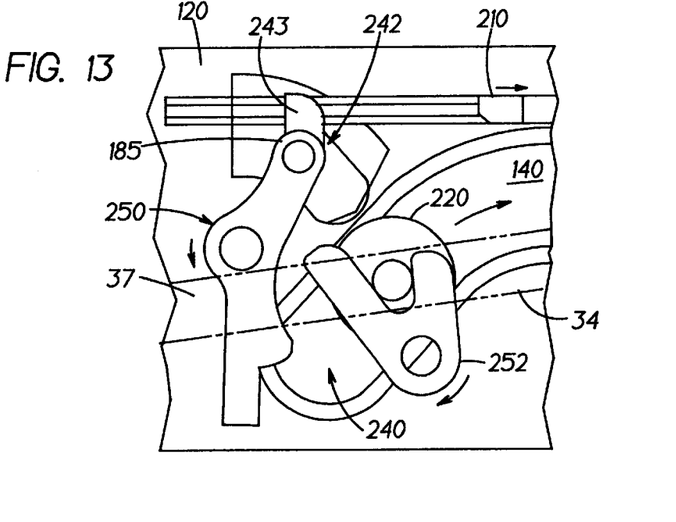
FIG. 13 is an enlarged view of a section of the latch assembly in the fifth position.

Now referring to FIGS. 12–13 in which a fifth position of the removable roof panel assembly 100 is shown. In this fifth position, the latch assembly 240 becomes fully unlatched. The continued movement of the release member 280 in a direction towards the second end 106 of the base 102 continues to pull the guide member 280 within the second channel 140 towards the second end 106. The second end 284 of the guide member 280 rides upwardly within the lower recessed section 154. As illustrated, in the fifth position, the second end 284 of the guide member 280 has been displaced from the lower recessed section 154 and is disposed generally within the second channel 140. This positioning of the guide member 280 causes the front end 35 of the roof panel 34 to be lifted before rear end 37 because lost motion of release member 210.

Referring now specifically to FIG. 13 in which the latch assembly 240 is shown in greater detail. In this position, the latch assembly 240 is unlatched. The latch arm 250 has rotated counter-clockwise to its original position shown in FIG. 4. As shown in FIGS. 12 and 13, in the fifth position, the release member 210 has cleared the connector 242 and therefore the connector 242 returns to its original position. Accordingly, the connector 242 is positioned against the upper edge 185 of the first slot 184 of the base cover 120. The roof panel 34 can now fully open because the latch catch member 252 has cleared the latch arm 250 permitting the continued movement of the roof panel 34. The latch catch member 252 continues to rotate clockwise as the rear end 37 of the roof panel 34 is raised and the roller member 220 travels within the second channel 140.

Figure 14:
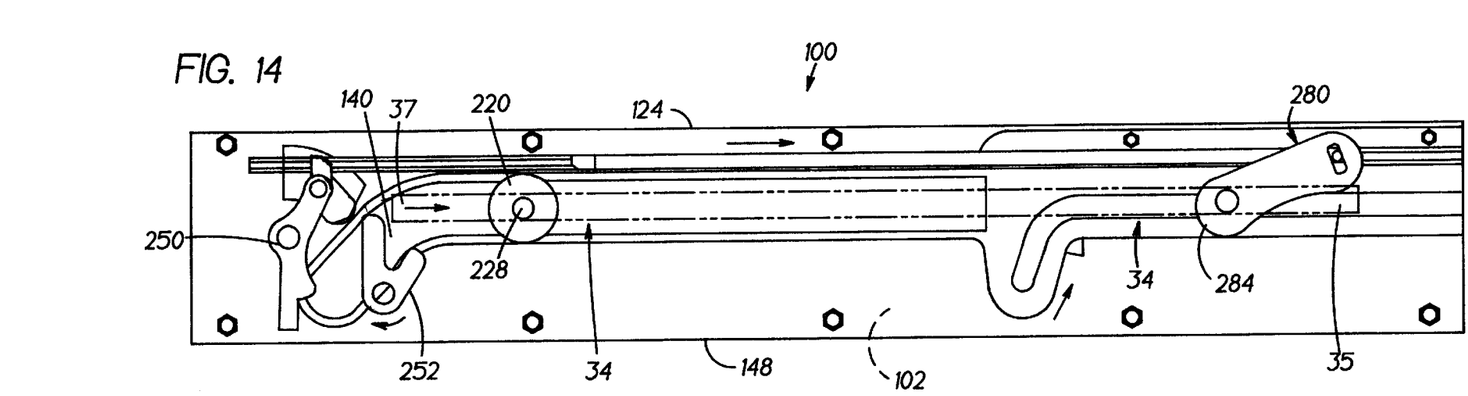
FIG. 14 is a sectioned side elevation view of the latch assembly in a sixth position.
Figure 15:
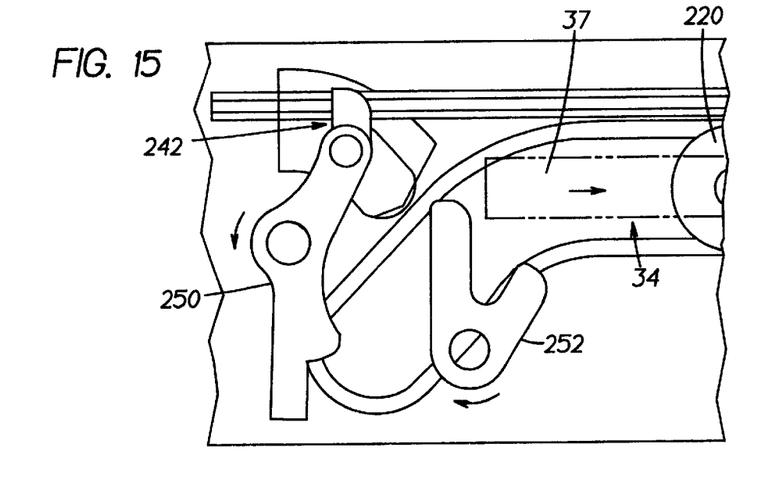
FIG. 15 is an enlarged view of a section of the latch assembly in the sixth position.

Referring now to FIGS. 14 and 15 in which a sixth position of the removable roof panel assembly 100 is shown. In this sixth position, the latch catch member 252 rotates clockwise to a stop position in which the first arm 270 is substantially vertically disposed. Because the latch catch member 252 is spring loaded, the first arm 270 will remain in this upward position. The coupler 222 and more specifically the boss 228 thereof has completely disengaged from the latch catch member 252 resulting in the roller member 220 and the coupler 222 traveling within the second channel 140. Because the coupler 222 attaches the roller member 220 to the roof panel 34, the positioning of the roller member 220 within the second channel 140 permits the roof panel 34 to slide therein. In this position in which the roof panel 34 is capable of sliding within the second channel 140, the second end 284 of the guide member acts as a roll member itself for the front end 35 of the roof panel 34 and the rear end 37 of the roof panel 34 is guided and moved by the roller member 220. In this position, the roof panel 34 is substantially parallel to the upper and lower surfaces 124, 148 of the base 102. FIG. 15 shows in greater detail the latch assembly 240 and the relative position of the roof panel 34 relative thereto. In this position, the roof panel 34 may be slid within the second channel 140 which permits the roof panel 34 to be pulled forward to thereby open a portion of the roof structure 14 (FIG. 1). Depending upon how much of the roof structure 14 is desired to be open, the roof panel 34 is positioned accordingly. Thus, in the unlatched position, the roof panel 34 may slide in either a forward or rearward direction to either open or close, respectively, the opening formed in the roof structure 14. The second channel 140 and track 141 and third slot 196 therefore act as tracts for the sliding of the roof panel 34.

Figure 16:
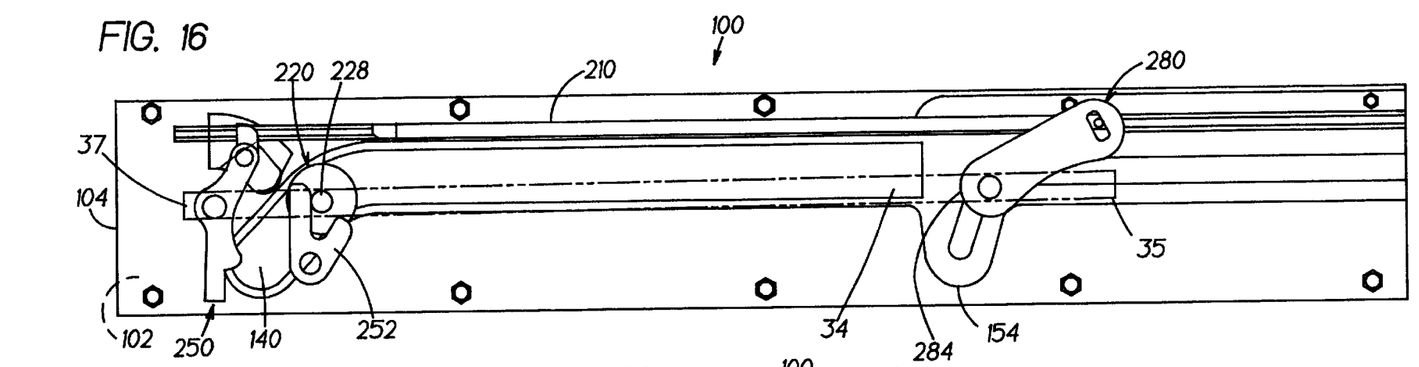
FIG. 16 is a sectioned side elevation view of the latch assembly in a seventh position.

Now referring to FIGS. 1 and 16 in which a seventh position of the removable roof panel assembly 100 is shown in FIG. 16. This Figure shows the process for latching the roof panel 34. As one would expect, the latching process is a process opposite to that of unlatching the roof panel 34. When it is desired to latch the roof panel 34, the motor drive unit 40 is actuated causing the cable 42 to be driven so that the release member 210 is driven within the first channel 122 towards the first end 104 of the body 102. As the rear end 37 of the roof panel 34 is driven within the second channel 140, the coupler 222 and roller member 220 likewise travel within the second channel 140 towards the latch assembly 240 which is in an unlatched position, as shown. At the same time, the guide member 280 also travels within the second channel 140 towards the first end 104 of the body 102. In FIG. 16, the second end 284 of the guide member 280 is guided into a mouth portion of the lower recessed section 154 of the second channel 140 so that further movement of the guide member 280 in this same direction will cause the second end 284 to drop within the lower recessed section 154.

Figure 17:
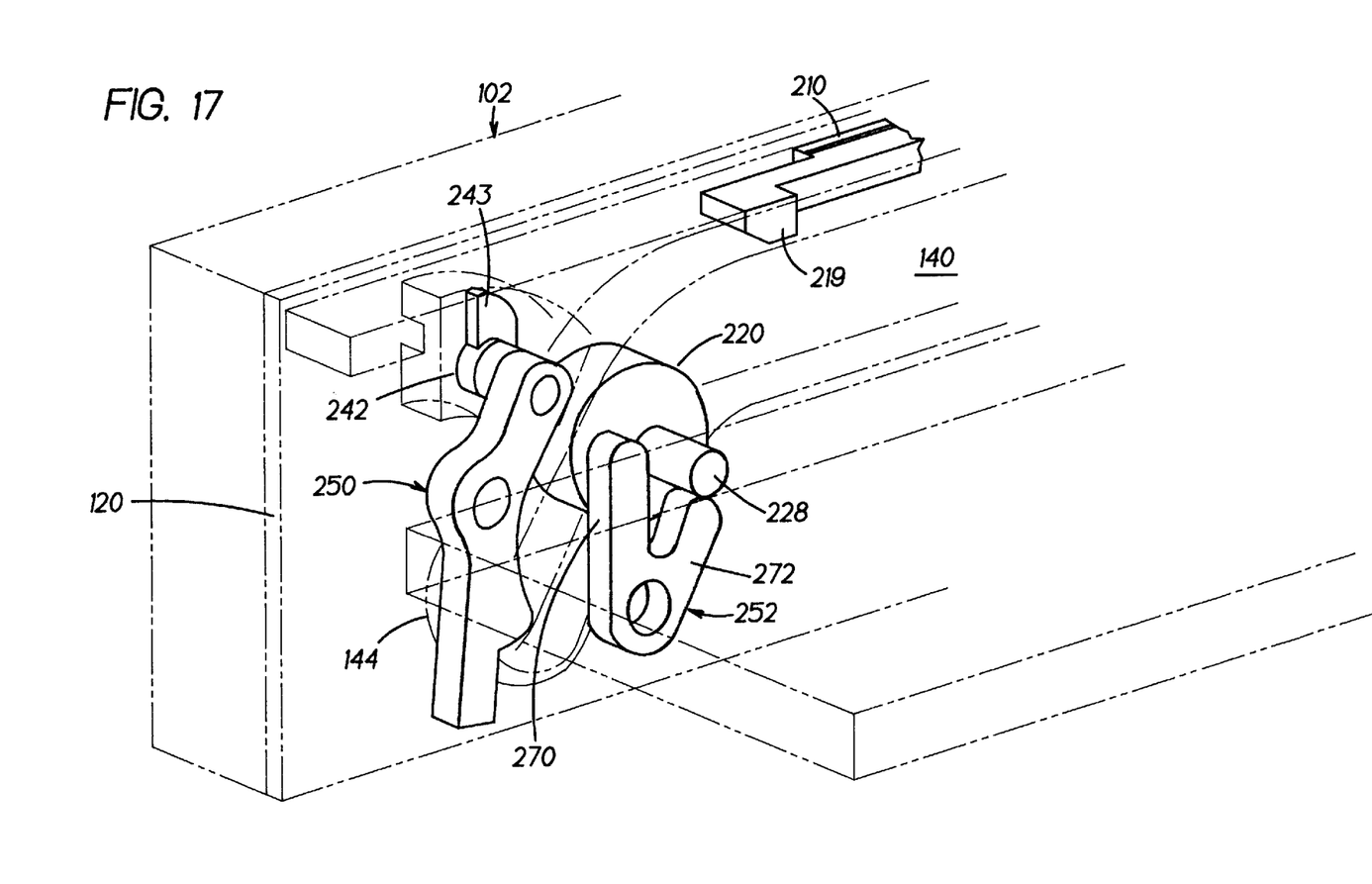
FIG. 17 is an enlarged view of a section of the latch assembly in the seventh position.

FIGS. 16 and 17 show the roller member 220 and the coupler 222 just prior to making contact with the latch catch member 252. More specifically, the boss 228 of the coupler 222 is disposed generally between the first and second arms 270, 272 of the latch catch member 252 and is generally adjacent to the first arm 270. Further movement of the roof panel 34 towards the first end 104 of the base 102 causes the boss 228 to contact the first arm 270 and drive the latch catch member 252 in a counter-clockwise direction. Because the roller member 220 has begun to descend within the angled first section 144 of the second channel 140, the rear end 37 of the roof panel 34 begins to lower relative to the front end 35 because the roller member 220 follows the shape of the second channel 140. The position and shape of the lower recessed section 154 is likewise intended to cause the front end 35 of the roof panel 34 to drop therein as the roof panel 34 travels within the second channel 140 towards the first end 104 of the base 102.

Figure 18:
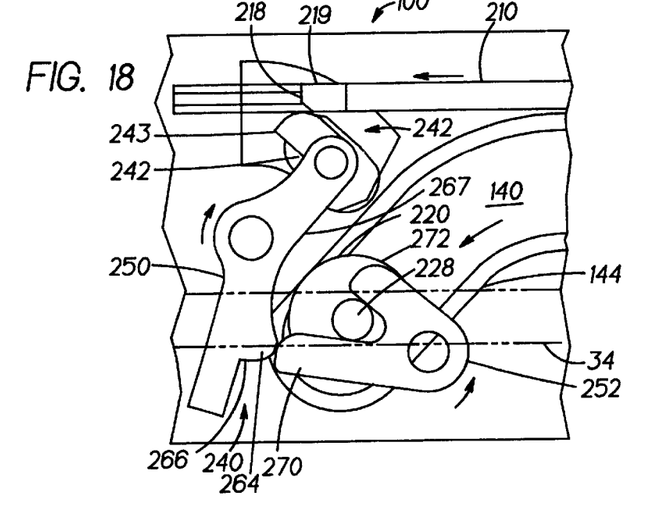
FIG. 18 is an enlarged view of the latch assembly showing the locking of a roof panel by the latch mechanism of FIG. 2.

Now referring to FIG. 18 in which an eighth position of the removable roof panel assembly 100 is shown. FIG. 18 shows the sequential movement of the roof panel 34, release member 210, roller member 220, coupler 222, and the latch assembly 240 during the latching process. The first end 212 of the release member 210 travels within the first channel 122 towards the first end 104 of the base 102 and the tab 219 contacts the flag portion 243 of the connector 242 and rotates the connector 242 in a counter-clockwise direction. Thus, force of the release member 210 against the connector 242 counters and overcomes the spring force of the connector 242. Meanwhile, the continued movement of the roof panel 34 causes the boss 228 of the coupler 222 to engage the latch catch member 252 due to the boss 228 contacting the first arm 270 and being caught between the first and second arms 270, 272. In other words, this movement of the roof panel 34 and roller member 220 causes the counter-clockwise rotation of the latch catch member 252. Once the first arm 270 seats against the shoulder 266, the latch assembly 240 is in the latched position and the roof panel 34 is locked into place.

Because the surface 267 of the latch catch member 250 is curved, it is designed to permit the latch catch member 252 to ride therealong and once the latch catch member 252 clears the shoulder 266, it locks in place. The counter clockwise rotation of the latch catch member 252 caused by the roller member 220 results in the clockwise motion of the latch arm 250. FIG. 18 illustrates the first arm 270 as it is clearing the ridge 264 and after it clears the ridge 264, the first arm 270 seats against the shoulder 266 which represents the latched position of the latch assembly 240. In this latched position, the roller member 220 is positioned at the closed first end 142 of the second channel 140. In this latched position, the roof panel 34 is fully retracted and is latched in a down position where the roof panel 34 seals the opening formed in the roof structure 14.

The present invention thus provides a latch assembly 240 for use in a removable roof panel assembly 100 for a vehicle. Unlike conventional motordriven roof panel structures, the assembly 100 of the present invention does not utilize a latch assembly which is motor-driven or actuated by a solenoid. Instead, the latch assembly 240 of the present invention is mechanically operated by a release member 210 which is connected to a cable 42 which is pulled or released by a motor drive unit 40 for the driving of the roof panel 34 to either an open or closed position or positions therebetween. Because the motor drive unit 40 also serves as the mechanism to cause the unlatching and latching of the latch assembly 240, the present invention provides a simple, cost effective latch assembly 240 which is not motorized in and of itself.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A latch assembly for use in an adjustable vehicle roof panel assembly including a roof panel which is driven by a drive unit, the latch assembly comprising:

a base portion having first and second channels formed therein;

a release member disposed within the first channel;

a guide member disposed within the second channel for directing a front end of the roof panel within the second channel;

a roller coupled to a rear end of the roof panel for guiding the roof panel within the second channel;

a latch arm;

a connector attached to the latch arm, the connector having a portion which extends within the first channel for selective contact with the release member, a latch catch member for releasably engaging the latch arm, wherein in a latched position, the latch arm engages the latch catch member and the roller is caught by the latch catch member to lock the roof panel in place; and wherein the roof panel is unlatched by driving the release member within the first channel so that the release member contacts the connector causing rotation of the latch arm so that the latch arm disengages the latch catch member freeing the roller and permitting the roof panel to travel within the second channel, the driving of the release member also causing the guide member to lift and guide the front end of the roof panel within the second channel.

2. The latch assembly as set forth in claim 1, further including:

a cable connected to the drive unit and the release member so that driving action of the cable causes the release member to travel within the first channel.

3. The latch assembly as set forth in claim 1, wherein the guide member includes a slot formed therein, the release member having a boss extending therefrom at one end thereof, the boss being received within the slot such that movement of the boss within the slot causes the front end to lift after the latch arm disengages from the latch catch member.

4. The latch assembly as set forth in claim 1, further including:

a base cover attached to the base, the base cover having first and second slots formed therein, wherein the roller travels within the first slot and a boss coupling the guide member to the front end of the panel travels within the second slot, the latch arm and the latch catch member being rotatably attached to an outer surface of the base cover.

5. A latch assembly for use in an adjustable vehicle roof panel assembly including a roof panel which is driven by a drive unit, the latch assembly comprising:

a base portion having first and second channels formed therein;

a release member disposed within the first channel, the release member being coupled to the drive unit so that actuation of the unit causes the release member to move within the first channel;

a guide member disposed within the second channel for directing a front end of the roof panel within the second channel;

a roller coupled to a rear end of the roof panel for permitting the roof panel to travel with the second channel;

a latch arm coupled to a connector which is partially disposed within the first channel for contact with a first end of the release member;

a latch catch member for releasably engaging the latch arm, wherein in a latched position, the roller is caught by the latch catch member to lock the roof panel in the latched position; and wherein the roof panel is unlatched by driving the release member within the first channel causing the first end to contact the connector resulting in the latch arm disengaging from the latch catch member to free the roller and permit the roof panel to travel within the second channel, the driving of the release member also causing movement of the guide member within the second channel for guiding the front end of the roof panel.

6. The latch assembly as set forth in claim 5, wherein the latch catch member includes first and second arms, the first arm for engaging the latch arm for releasably locking the latch arm, wherein in a latched position the roller is disposed between the first and second arms to prevent movement and lock the roof panel in the latched position.

7. The latch assembly as set forth in claim 5, wherein the roller comprises an annular roller member and a coupler having a boss received within and extending through an opening formed in the roller member, the boss being secured to the rear end of the roof panel.

8. The latch assembly as set forth in claim 5, wherein the connector includes a base section having a flag portion extending upwardly therefrom and a connector boss extending outwardly from the base, wherein at least a portion of the flag portion is disposed within the first channel for contacting the first end of the release member.

9. The latch assembly as set forth in claim 8, wherein the connector boss is received within a first opening formed in an upper section of the latch arm to coupled the connector to the latch arm.

10. The latch assembly as set forth in claim 5, wherein the first end of the release member includes a tab extending outwardly therefrom, wherein movement of the release member in a first direction causes the tab to strike the flag portion resulting in rotation of both the connector and the latch arm for disengaging the latch arm from the latch catch member.

11. The latch assembly as set forth in claim 5, wherein the base further includes a recessed section for receiving the connector, the recessed section being formed between the first and second channels, wherein a portion of the recessed section communicates with the first channel so that the first end of the release member can engage the connector.

12. The latch assembly as set forth in claim 6, wherein the latch arm includes a surface for permitting the roller to travel thereacross within the second channel, the latch arm having a shoulder which engages the first arm of the latch catch member in the latched position.

13. The latch assembly as set forth in claim 5, wherein the guide member has a slot formed at a first end thereof, the slot receiving a boss extending from a second end of the release member to link the first end of the guide member to the release member so that movement of the boss within the slot causes the front end to lift and ride within the second channel after the latch arm disengages the latch catch member.

14. The latch assembly as set forth in claim 5, wherein the guide member has a first boss extending outwardly therefrom at a second end thereof, the first boss being secured to the front end of the roof panel, the guide member having a second boss extending outwardly in a direction away from the first boss, the second boss riding within a track formed in the base.

15. The latch assembly as set forth in claim 5, wherein the second channel includes a recessed section which receives one end of the guide member when the roof panel is the latched position.

16. The latch assembly as set forth in claim 5, wherein the base forms a part of a side rack disposed on one side of a roof of a vehicle.

17. The latch assembly as set forth in claim 5, wherein the second channel includes a first section angled downwardly proximate a first end of the base and a recessed section formed between the first section and an opposing second end of the base, wherein in the latched position, the roller is disposed within the first section and the guide member is disposed within the recessed section.

18. The latch assembly as set forth in claim 5, further including:
 a base cover disposed on a first surface of the base, the base cover at least partially enclosing portions of the first and second channels, the base cover having first and second slots formed therein, the first slot having a first angled section which communicates with a corresponding angled section of the second channel, the second slot having a second angled section which communicates with a recessed section of the second channel.

19. The latch assembly as set forth in claim 18, wherein the latch arm and the latch catch member are rotatably attached to the base cover so that clockwise rotation of the connector causes clockwise rotation of the latch arm which results in the latch arm disengaging from the latch catch member causing clockwise rotation of the latch catch member and release of the roller.

20. The latch assembly as set forth in claim 18, wherein the recessed section is generally U-shaped and a first boss extending from the guide member into the roof panel rides within the second slot and the roller rides within the first slot, the roller and the first boss being initially positioned within the angled section of the second channel and the recessed section, respectively when the roof panel is in the latched position and the roller and first boss riding upwardly within the second channel when the roof panel is raised during unlatching thereof.

21. The latch assembly as set forth in claim 5, wherein the guide member includes a second boss extending therefrom, the second boss being received and riding within a track formed in the base.

22. The latch assembly as set forth in claim 18, wherein the base cover includes a third slot in which a portion of the connector extends therethrough and is frictionally attached to the latch arm.

* * * * *